United States Patent [19]

Hildebolt

[11] 4,226,576
[45] Oct. 7, 1980

[54] PROTEIN TEXTURIZATION BY CENTRIFUGAL SPINNING

[75] Inventor: William M. Hildebolt, Mickleton, N.J.

[73] Assignee: Campbell Soup Company, Camden, N.J.

[21] Appl. No.: 870,525

[22] Filed: Jan. 18, 1978

[51] Int. Cl.[3] .............................................. B29D 7/02
[52] U.S. Cl. ...................................... 425/69; 425/381
[58] Field of Search .................. 425/7, 8, 10, 69, 381; 264/176 C, 8, 12; 426/802, 641, 656, 506, 511, 516, 508, 507, 509

[56] References Cited

U.S. PATENT DOCUMENTS

| | | | |
|---|---|---|---|
| 1,293,535 | 2/1919 | Perry | 264/209 |
| 2,238,591 | 4/1941 | Hoves et al. | 264/202 |
| 2,336,743 | 12/1943 | Manning | 425/7 |
| 2,714,744 | 8/1955 | Becker | 264/349 |
| 2,810,426 | 10/1957 | Till et al. | 425/7 |
| 3,400,189 | 9/1968 | Nacke | 264/167 |
| 3,920,362 | 9/1975 | Bradt | 425/7 |
| 4,062,987 | 12/1977 | Hildebolt | 426/802 |

FOREIGN PATENT DOCUMENTS 46-28204  8/1971  Japan .............................. 425/382.2

*Primary Examiner*—Jay H. Woo
*Attorney, Agent, or Firm*—Schuyler, Birch, McKie & Beckett

[57] ABSTRACT

A bland texturized monofilament protein product having a texture and mouth feel simulating animal meat is prepared by forming an aqueous slurry of a protein material, injecting high pressure steam into the slurry to propel it through a confined treatment zone, centrifugally spinning the protein material into monofilaments, and recovering the textured monofilaments in a collection zone. Apparatus for performing this process comprises means for injecting steam into a protein slurry, means defining a confined treatment zone wherein the injected steam and protein are contacted, and means for centrifugally spinning the steam-treated protein material into monofilaments.

7 Claims, 9 Drawing Figures

PROTEIN TEXTURIZATION BY CENTRIFUGAL SPINNING

BACKGROUND OF THE INVENTION

1. Field of the Invention

This invention relates to the treatment of untextured protein materials to form a product possessing the fibrous texture and mouth feel properties of animal meat.

2. Description of the Prior Art

The food industry has spent much effort over a span of many years and has expended large sums of money in an attempt to utilize non-meat proteins, such as those derived from vegetables, as additives to or substitutes for animal meat products. It long has been recognized that the ever-increasing worldwide food shortage could be in material part obviated if only such relatively inexpensive materials could be converted into products so closely approximating the naturally occurring food material that public acceptance would be achieved. One of the major roadblocks encountered by the industry has been the inability to impart the natural and accustomed chewy, fibrous texture to vegetable protein materials. Animal meat products inherently possess a texture giving them a definite "mouth feel" which is clearly recognized and strongly preferred. Vegetable proteins in their natural state generally take the form of amorphous powders which, despite their unquestioned nutritive value, possess mouth feel characteristics wholly unacceptable to the consumer as a meat substitute. Moreover, vegetable proteins normally are characterized by objectionable "beany" flavors which the industry has been unable to remove or mask.

In recent years a number of processes and apparatus have been developed for treating vegetable protein material to produce a bland texturized product. None of these processes, however, has achieved any substantive measure of commercial success.

The first generation of these prior art techniques involved the wet spinning process disclosed in Boyer, U.S. Pat. No. 2,730,447. This process produces a fibrous product by extruding a plurality of fine streams of an aqueous solution of protein into a chemical coagulating bath. The protein coagulates into fine fibers which are collected together and treated to form an edible textured protein product. The wet spinning process suffers from a number of drawbacks in addition to its general failure to produce an adequately textured product as discussed above. The equipment employed to perform this process is extremely sophisticated for the food industry and represents a very high initial cost problem. Adding further to the economic infeasibility of the product produced by the wet spinning process is the expensive starting materials which must be employed. Moreover, product uniformity is difficult to achieve due to the general complexity of the process and the numerous parameter control problems presented.

The second generation technique advanced in this area is the extrusion cooking process disclosed in Atkinson, U.S. Pat. No. 3,488,770, in which a protein mass is physically worked at an elevated temperature and thereafter extruded at an elevated temperature and pressure through an orifice into a medium of lower pressure and temperature. This process also suffers from high equipment costs. In addition, the product produced by extrusion cooking has a very low density which swells up in water to give a "spongy" texture. Moreover, the product contains objectionable flavor notes in addition to the "beany" flavor originally present in the starting materials which are apparently imparted to the product by the processing steps.

The third generation of development in the protein texturization involves the use of steam as the texturizing medium. Exemplary of this approach are Strommer, U.S. Pat. Nos. 3,754,926 and 3,863,019 which treat either finely divided protein particles or slurries with steam and Heusdens U.S. Pat. No. Re. 28,091 which employs a steam treatment of a protein slurry following complex hydration steps. Products produced by these processes also possess the general problems of poor texture and flavor discussed above. In addition, the product has low density problems similar to the second generation extrusion cooked products in that on hydration they tend to be very soft. The product is also extremely friable.

Other attempted solutions by the art include the cooking and shaping of a protein dough disclosed in McAnelly, U.S. Pat. No. 3,142,571, and the heat coagulation of undenatured protein disclosed in Rusoff, U.S. Pat. No. Re. 27,790.

Notwithstanding the veritable plethora of prior art attempts to satisfactorily texturize vegetable proteins—no one to data has made any really substantial progress toward the desired goal. The present absence from the market of any commercially accepted consumer products based on vegetable protein demonstrates clearly that the problems involved simply have not been solved. Indeed, those meat analog products which have found their way to the supermarket shelves generally have been met with little or no consumer acceptance and have generally been withdrawn. Especially in the United States, where consumer preferences rather than nutritional values often dictate the fate of food products, a successful texturized vegetable protein material simply must possess taste and mouth feel characteristics similar to natural meat. In addition, the prior art processes generally have employed such complex apparatus and procedures that initial equipment and operating costs have made protein analog products economically unattractive to manufacturers, despite the relatively inexpensive nature of the raw product.

Given the ever-increasing fears of worldwide famine and the diminishing availability of animal meat protein products, it is clear that an inexpensive, consumer-acceptable, high protein food product based on texturized proteins is urgently needed.

BRIEF SUMMARY OF THE INVENTION

It is the object of the present invention to provide a process and apparatus for texturizing protein which fulfills the need left by the prior art texturizing processes.

More specifically, it is an object of the present invention to provide a process and apparatus for producing monofilamentary protein material having a fibrous texture simulating that of natural meat.

It is a further object of the present invention to provide a process and apparatus which will produce a bland flavored protein product.

Another object of the present invention is to provide a process and apparatus which will produce a retort stable protein product.

It is also an object of this invention to provide a texturizing process and apparatus which will produce such a product at a much lower cost due to lower initial equipment costs and lower operating costs.

Accordingly, the method of the present invention comprises treating a slurry of protein material with an injected stream of heated gas in a confined zone at elevated temperature and pressure, centrifugally spinning the treated protein material to form protein monofilaments, and recovering the texturized protein monofilaments in a collection zone.

The present invention further provides apparatus for producing texturized protein monofilaments which comprises means for treating a protein slurry with injected gas at an elevated temperature and pressure, means for centrifugally spinning the protein material into monofilaments, and means for recovering texturized protein monofilaments in a collection zone.

DETAILED DESCRIPTION OF THE INVENTION

Figure 1:
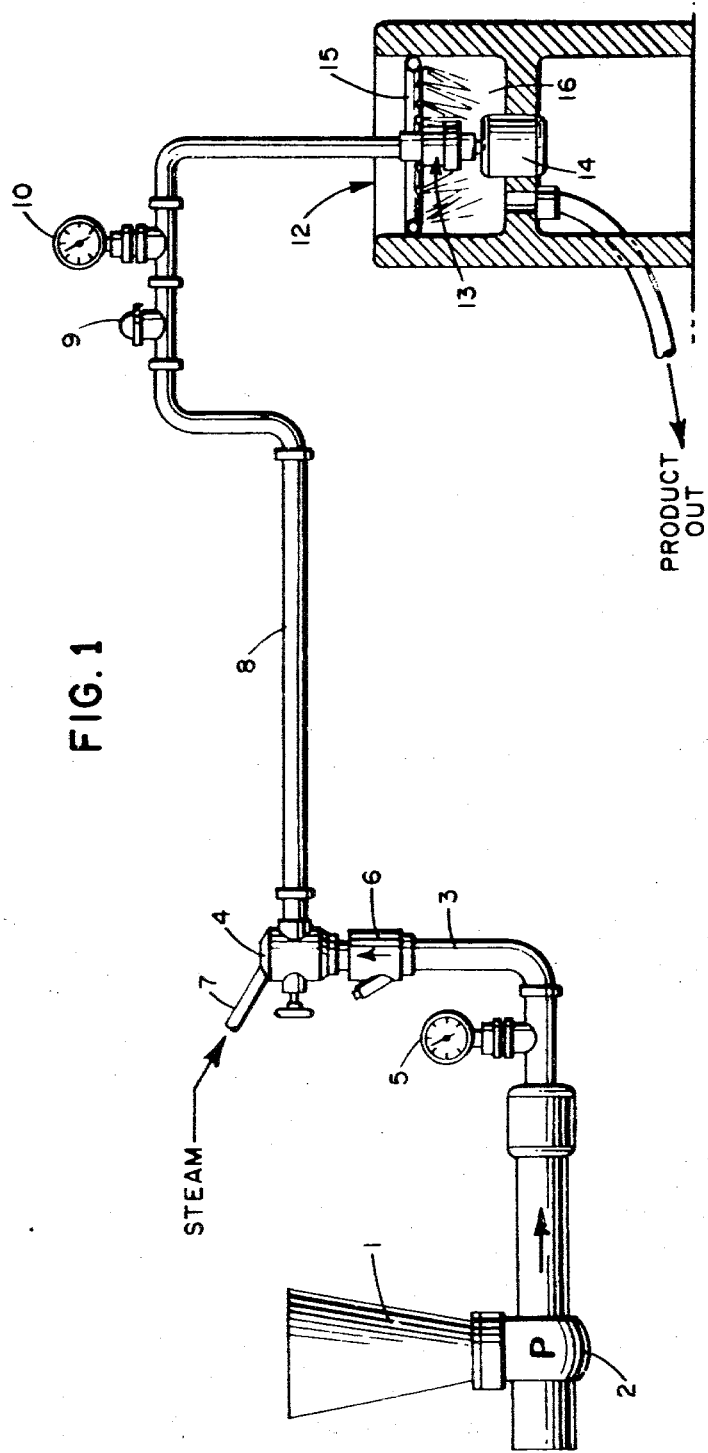
FIG. 1 is a schematic of the protein texturizing apparatus of the present invention.

The present invention is directed to a process and apparatus for producing texturized protein monofilaments. The term texturizing as used herein and widely understood in the art refers to the process of changing globular amorphous particles of protein into fibrous continuous phase protein material having structural integrity.

The term retort stable as used herein refers to a product which keeps its structural integrity after treatment at elevated temperature and pressure. In the typical retort processing test about 1 part texturized protein is mixed with 10 parts of a 1% salt solution and sealed in a can. The can then is placed in a retort and subjected to a temperature of 250° F. and a pressure of 15 psig for about 60 minutes. The ability of a retorted product to maintain its structural integrity and bite characteristics can be tested by placing the product between the thumb and forefinger and subjecting the product to shear forces. A retort stable product will not disintegrate with moderate finger pressure. A product with poor retort stability will feel mushy and will fall apart when subjected to moderate shear forces.

Protein material employed in the process of the present invention should contain at least 70% protein on a dry weight basis, with 70 to 75% preferred for meat-simulating bite and 90% or higher for a very firm, tough bite. Of primary interest are vegetable protein materials derived from soybean. Soy proteins can take the form of soy flour, soy concentrate, soy isolates or mixtures thereof. Suitable protein mixtures can consist of from about 50 to 60% soy flour and from about 40 to 50% soy isolate. Other oilseed materials such as peanut, cottonseed and sesame seed may also be employed. Other known protein sources such as those derived from wheat, milk, eggs, single cell or leaf proteins and the like may be texturized according to the process of the present invention. Protein material employed should be viable, i.e., have a PDI (Protein Dispersability Index) in the range of from 50 to about 90%.

The process and apparatus of the present invention may also be employed to texturize a mixture of meat and a protein binder. Meat proteins may comprise meat scraps or pieces possessing poor textural qualities such as mechanically deboned chicken, beef, seafood, and the like or desired blends. Suitable protein binders include vegetable proteins such as soy protein or other known proteins such as those derived from wheat, single cell, leaf, milk, egg, and the like. In general, mixtures containing up to about 80% comminuted meat may be texturized according to the process of the present invention. For most applications, mixtures containing from about 50 to about 75% meat provide the best results.

In accordance with the process of the present invention the protein material described above initially is mixed with water to form a dough-like proteinaceous slurry. This slurry should contain about 40 to 50% solids. If desired, a pumping aid such as, for example, sodium bisulfite, may be employed to reduce the viscosity of the slurry. The protein slurry then is treated with steam in a confined zone maintained at an elevated temperature and pressure. Preferably, this steam treatment takes place in a jet-cooking apparatus. In this type of apparatus, the slurry is advanced through a feed pipe to a steam injection zone by a feed pump. The slurry feed rate will depend on the particular apparatus employed. In pilot plant size apparatus, rates of about 6 to 15 pounds per minute have been employed, whereas in production applications, rates of from about 20 to 50 pounds per minute or more may be employed. High pressure steam then is injected directly into the protein slurry in the injection zone. The high steam pressure and the resulting turbulence insures rapid and uniform heat transfer to the protein slurry. The steam pressure should be sufficiently high to overcome the pressure of the slurry from the feed pump and to propel the slurry out of the steam injection zone. Pressures in the range of about 80 to about 150 psi are suitable to achieve this result. Best results are achieved when the steam pressure is in the range of about 100 to about 120 psi.

The high pressure steam flow leaving the injection zone propels the protein slurry into a confined treating zone. A predetermined elevated temperature and pressure are maintained in the confined treating zone to render the protein into a thermoplastic state. The protein product should be held under pressure in the confined treating zone until a temperature of about 310° to 350° F. is reached. Preferably, temperatures of about 325° to about 350° F. are employed. The residence time in the confined zone is not critical and may range from a few seconds up to one or two minutes. Residence time values may be controlled by varying the slurry feed rate and the length of the zone.

The protein material which has been rendered thermoplastic by the preceding steam treatment next enters a rotating multi-orifice spinnerette head located at the discharge end of the confined treating zone. The centrifugal forces created along the axis of the spinnerette act to draw, stretch, and orient the emerging protein monofilaments. Spinnerette rotations in the range of about 1000 to about 2000 RPM are suitable to form monofilaments. Optimum results are achieved at about 1800 RPM. By varying the spinnerette RPM's and the pressure and temperature conditions in the cooking tube, fiber lengths from about ½ to about 6 inches can be obtained. The spinnerette head further serves to maintain a back pressure of about 70 to 80 psi in the confined zone.

In the preferred embodiment the fibers emerging from the spinnerette are quenched by sprays of a cooling fluid, e.g., water, directed at the product. The resulting stream of water is useful to carry the product out of the centrifuge and into a collection zone where the fibers are recovered in a known manner.

In another embodiment of the present invention the centrifuge may be operated without the water sprays. In this embodiment the filamentary product is allowed to build up on the walls of the recovery zone to form a belt-like structure of fused filaments all oriented in the direction of rotation. This belt or shell of fused product may be cut longitudinally and removed from the recovery zone as a unitary piece. When this large piece is diced, it exhibits a fused fiber bundle structure which closely resembles muscle fiber.

In a further embodiment the thermoplastic protein material in the cooking tube is subjected to stretching forces before it reaches the spinnerette head. This stretching step is preferably accomplished by passing the thermoplastic protein material through an orifice restriction, i.e., a washer-like obstruction in the flow path which effects a momentary reduction of the cross section in the cooking tube. By way of example, a restriction means having an orifice diameter of from about 7/16 to 13/16 inch have been successfully utilized in a 1½ inch cooking tube. The internal structural characteristics of the spun protein fibers are enhanced by this additional treatment.

One embodiment of the apparatus of the present invention now will be described by reference to FIG. 1. The slurry of protein to be texturized and water is formed in any suitable mixing means 1 such as a Hobart mixing bowl. Discharge from the mixing means is forwarded by a feeding means 2 communicating through a feed line 3 with a steam injection zone 4. The feeding means can be any device capable of forwarding a relatively high consistency slurry. Positive displacement pumps such as the "Moyno" pump are well suited for this application. The feed line can contain a pressure gauge 5 and a check valve 6 which is effective to prevent back flow in the feed line.

Steam injection zone 4 comprises a mixing valve assembly in which the protein slurry from the feed line and high pressure steam are mixed. Any valve assembly which can effect a rapid and intimate mixture of steam and protein slurry without clogging can be employed. One suitable valve is the Schutte & Koerting Model #320 1¼" NPT. Steam enters the injection zone via inlet line 7. Communicating with the discharge from the injection zone is a confined treating zone 8. In the preferred embodiment this treating zone comprises an elongated cylindrical chamber or cooking tube. The dimensions of this chamber are not critical. In practice, lengths of from 7 to 13 feet have been satisfactorily employed. The diameter should be large enough to prevent clogging and small enough to facilitate the maintenance of proper pressure conditions. Diameters in the range of about 1½ to 6 inches have been found to satisfy these conditions although a maximum of 3 inches is preferred. The chamber may be provided with temperature sensing element 9, and a discharge pressure gauge 10.

The discharge end of the cooking tube is provided with means for centrifugally spinning the protein material, generally shown as 12. The centrifugal spinning means comprises a rotating multi-orifice spinnerette head 13 which is driven by a motor 14 or other suitable means. Cold water spray nozzles 15 may also be provided to quench the emerging monofilaments. The cold water nozzles are preferably arranged concentrically outside and above the spinnerette head. The centrifuge assembly is also provided with a product recovering zone 16 in which the monofilaments and water mixture may be collected. The cross section spun fibers may be varied by employing spinnerette orifices of different shape.

Figure 2:
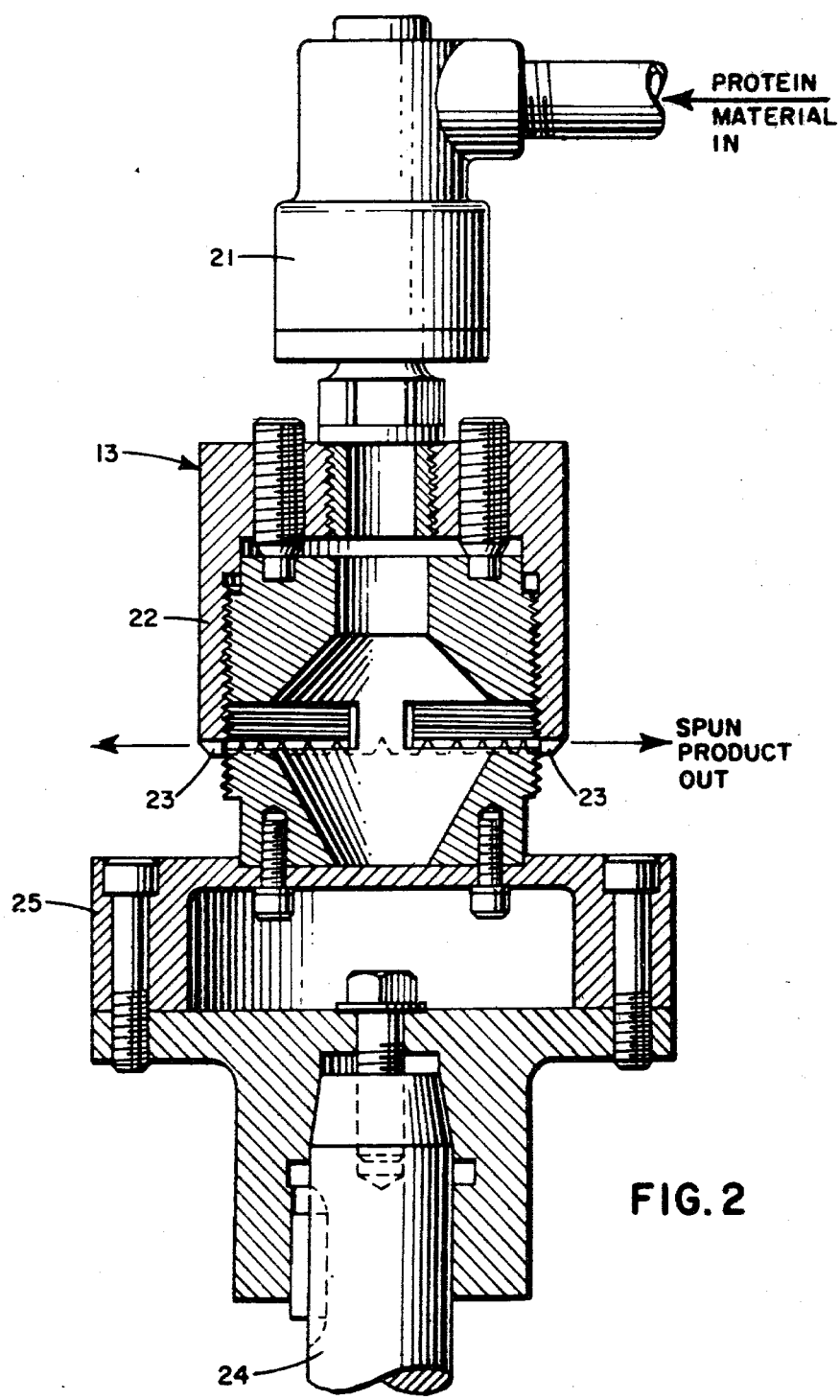
FIG. 2 shows the construction of one embodiment of the spinnerette head employed in the present invention.

Details of the preferred spinnerette head assembly are shown in FIG. 2. Rotary joint 21 receives the protein material from the cooking tube and feeds it to the spinnerette head 22. Spinnerette orifices 23 provide outlets for the spun product. The entire assembly is rotated by a centrifuge motor (not shown) through drive shaft 24 coupling 25.

Figure 3:
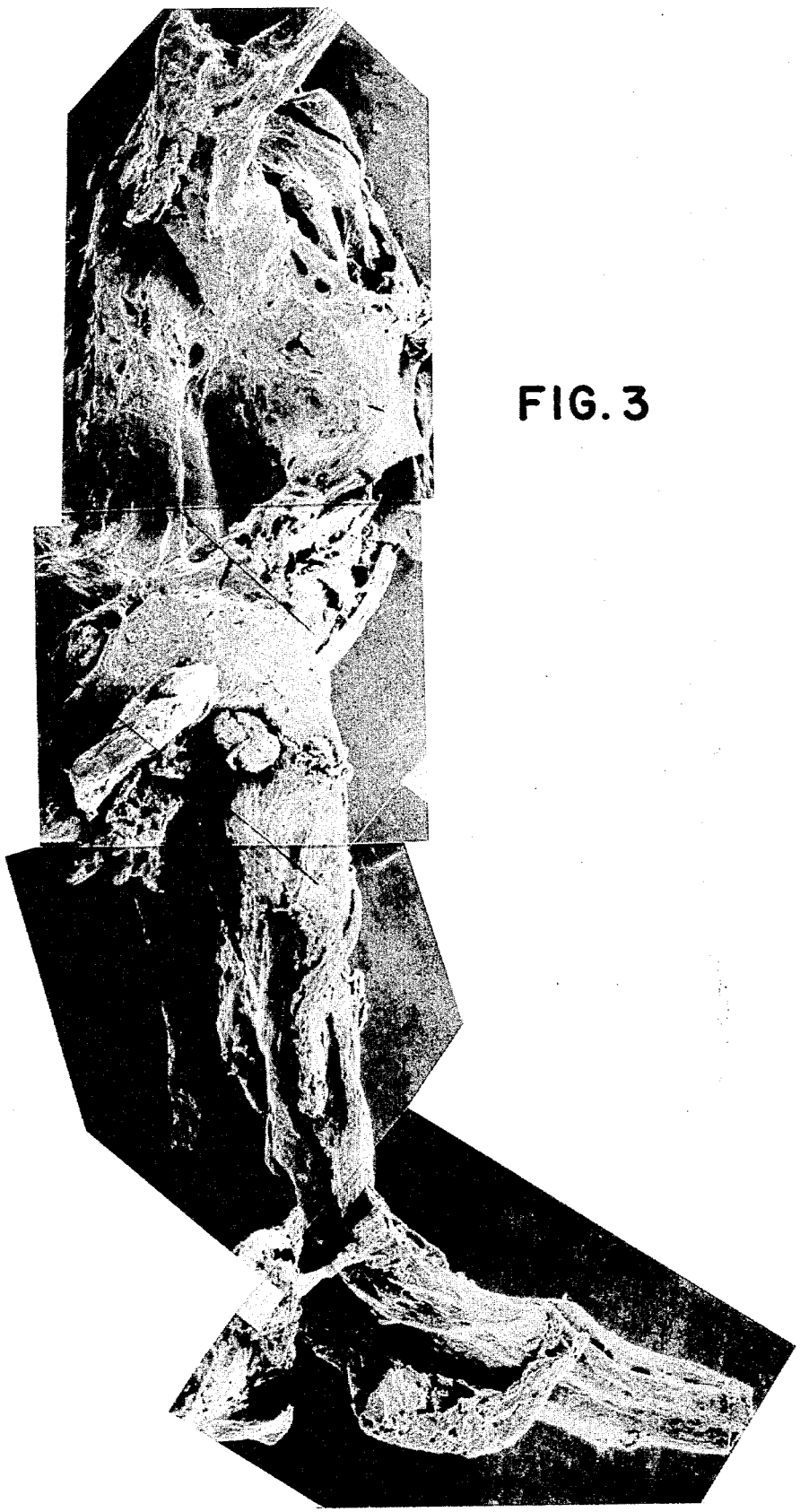
FIG. 3 is a photomicrograph taken at 25X of a single texturized protein fiber produced by the process of the present invention.
Figure 4A:
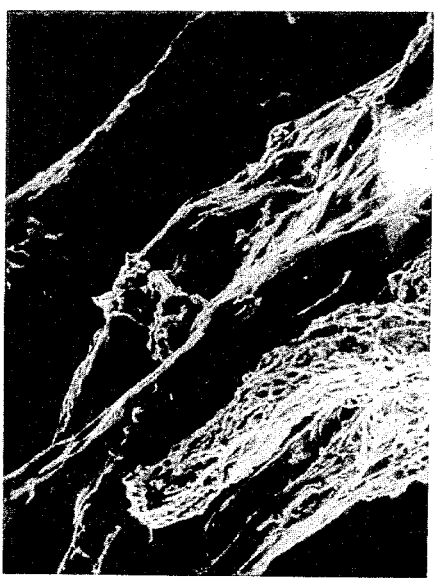
FIG. 4 is a series of photomicrographs showing the internal structure of the fiber of FIG. 3; 4a is taken at 50X; 4b at 100X; 4c at 300X; 4d at 500X; 4e at 1000X; and 4f at 1500X.
Figure 4B:
Figure 4C:
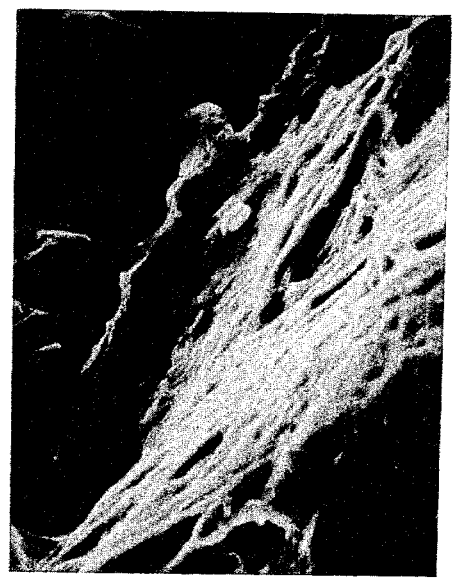
Figure 4D:
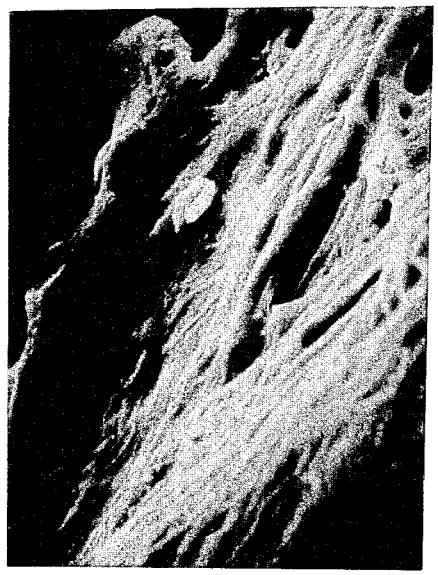
Figure 4E:
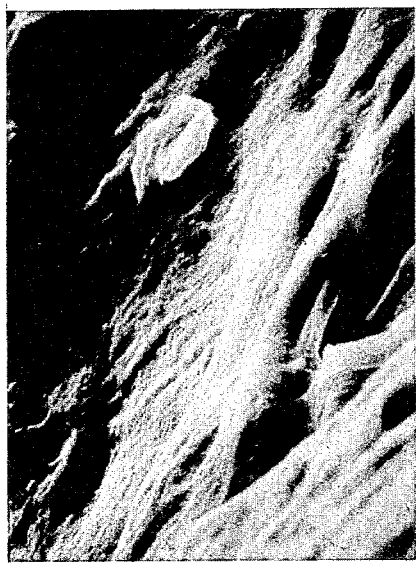
Figure 4F:

The product produced by employing the process parameters and apparatus of the present invention is a monofilamentary texturized protein material having structural and eating properties similar to animal meat products. The product possesses good striated muscle laminate structure which heretofore could not be achieved by the prior art. As shown in FIG. 3, this product also possesses a very dense complex matrix and excellent random cross fiber development. This structure exhibits excellent mouth feel, i.e., the bite and shear properties of the product of the present invention simulate the chewing of animal meat tissue. Furthermore, the product is free from objectionable flavor notes which often made prior art products unacceptable to humans. Another advantage achieved by the process and apparatus of the present invention lies in the retort stability of the product. Thus, the protein product may be processed by conventional food preparation techniques without thermal degradation of its physical properties.

Products produced by the process of the present invention find utility in a number of food processing fields. The fibrous textured protein monofilaments may be combined with suitable binders and adjuvants to provide meat analogs having the appearance, taste, and chewability of animal meat products. These fibers have particular utility in the formation of seafood analogs such as lump crabmeat or lobster meat. The texturized protein product produced according to the embodiment of the present invention using no water sprays may be diced or otherwise cut into portions suitable for direct incorporation into canned or frozen foods. The texturized protein product of the present invention may also be employed as a filler or extender in ground meat products. It is also possible to produce fabricated nutrients from the protein material produced according to the present invention.

The process of the present invention is also useful to upgrade or restructure meat scraps or by-products with little or no food value due to their poor structural characteristics.

The following specific examples are intended to illustrate more fully the nature of the present invention without acting as a limitation on its scope.

EXAMPLE 1

Textured soy protein monofilaments are produced according to the process of the present invention as follows: 4,282 grams of protein mixture comprising 50% Promine R (a soy isolate containing about 95% protein produced by Central Soya, Inc.) and 50% Soy Flour 200W (a soy flour containing about 50% protein produced by Central Soya, Inc.) is slurried with water to provide a solids content of 40%. 20 grams of sodium bisulfite is added to the slurry to decrease its viscosity. This slurry is texturized in the apparatus of the present invention as shown in FIG. 1. The slurry is formed in a Hobart bowl mixer equipped with pastry hooks and forwarded by a Model 3L4 Moyno pump. The steam mixing valve is a Schutte & Koerting Model #320 1¼" NPT. The steam supply is 110 psi and in this apparatus the resulting steam velocity is in the range of about 50' per second. The temperature in a 1½" diameter, 10' long cooking tube is maintained at 320° F. The back pressure in the cooking tube is about 70 psi. The orifices in the spinnerette head are set at 0.070" and the head is rotated at 1800 RPM. The product issuing from the spinnerette head consists of 2 to 3" fibers which are quenched by a water spray. The fibers are very white and exhibit good textural qualities.

EXAMPLE 2

This example demonstrates another embodiment of the present invention which comprises allowing the spun fibers to build up and fuse on the sides of the recovery zone. Textured protein fibers are spun as in Example 1, but this time the water sprays are not employed. The fibers are allowed to build up and fuse on the inside wall of the recovery zone and then are removed. The resulting belt-like protein mass is quenched with cold water at 50° F. and diced. Upon retort processing the diced protein material exhibits good color and stability. The texture of this material consists of a unidirectional bundle of fused spun fibers closely resembling muscle fibers.

EXAMPLE 3

In this example the protein material consists of 45% Promine R and 55% Soy Flour 200W. The slurry is adjusted to 40% solids and texturized as in Example 1 except that an orifice restrictor having 9/16 inch orifice diameter is placed in the cooking tube just upstream from the entrance to the spinnerette head. The back pressure in the cooking tube is 72 psi, the spinnerette orifice is set at 0.050", and the head is rotating at 1800 RPM. The water spray is used for this run. The spun product consists of thin uniform fibers of approximately ¾ inch. This product is highly suitable for use in seafood analogs such as crab or lobster meat.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. Apparatus for producing texturized monofilaments of protein material comprising:
   (a) means for treating a protein slurry with injected gas at an elevated temperature and pressure;
   (b) means for centrifugally spinning said protein material into monofilaments; and
   (c) means for recovering texturized protein monofilaments in a collection zone.

2. The apparatus of claim 1 wherein said means for treating comprises an elongated confined zone through which said protein slurry is propelled by a flow of said injected gas.

3. The apparatus of claim 1 wherein said means for centrifugally spinning comprises a rotating multi-orifice spinnerette head.

4. The apparatus of claim 3 wherein said means for centrifugally spinning additionally comprises means for directing a spray of cooling fluid on the protein monofilaments issuing from said spinnerette head.

5. Apparatus for producing texturization monofilaments of protein material comprising:
   (a) means for mixing a source of protein and water to form a slurry;
   (b) means for advancing said slurry to an injection zone;
   (c) means for injecting a gas flow into said slurry in said injection zone;
   (d) means defining a confined treating zone communicating with said injection zone, whereby said gas flow propels said slurry into and through said confined treating zone;
   (e) means for centrifugally spinning said protein material into monofilaments; and
   (f) means for recovering texturized protein monofilaments in a collection zone.

6. The apparatus of claim 5 wherein said means for centrifugally spinning comprises a rotating multi-orifice spinnerette head.

7. The apparatus of claim 6 wherein said means for centrifugally spinning additionally comprises means for directing a spray of cooling fluid in the protein monofilaments issuing from said spinnerette head.

* * * * *

UNITED STATES PATENT AND TRADEMARK OFFICE
CERTIFICATE OF CORRECTION

PATENT NO. : 4,226,576
DATED : October 7, 1980
INVENTOR(S) : William M. Hildebolt It is certified that error appears in the above—identified patent and that said Letters Patent is hereby corrected as shown below:

Column 2, line 26 "data" should read — date —.

Column 4, line 43, "100" should read — 110 —.

Signed and Sealed this

Sixth Day of January 1981

[SEAL]

Attest:

SIDNEY A. DIAMOND

Attesting Officer

Commissioner of Patents and Trademarks